US012261397B2

(12) United States Patent
Liu et al.

(10) Patent No.: US 12,261,397 B2
(45) Date of Patent: Mar. 25, 2025

(54) ELECTRICAL CONNECTOR WITH EASIER MANUFACTURING AND ASSEMBLY

(71) Applicant: JESS-LINK PRODUCTS CO., LTD., New Taipei (TW)

(72) Inventors: Ching-Hung Liu, New Taipei (TW); Ming-Yang Yuan, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 340 days.

(21) Appl. No.: 17/903,973

(22) Filed: Sep. 6, 2022

(65) Prior Publication Data

US 2024/0014604 A1 Jan. 11, 2024

(30) Foreign Application Priority Data

Jul. 5, 2022 (CN) ......................... 202221733847.7

(51) Int. Cl.
*H01R 13/652* (2006.01)
*H01R 13/405* (2006.01)

(52) U.S. Cl.
CPC ......... *H01R 13/652* (2013.01); *H01R 13/405* (2013.01)

(58) Field of Classification Search
USPC .................................. 439/92, 101, 106, 107
See application file for complete search history.

(56) References Cited

U.S. PATENT DOCUMENTS 8,951,050 B2 * 2/2015 Shiratori ............ H01R 13/6597 439/660
2004/0127098 A1 * 7/2004 Kuo .................. H01R 13/6593 439/607.01
2009/0305534 A1 * 12/2009 Tanaka ................... H01R 24/60 439/108
2020/0343674 A1 * 10/2020 Nogawa ............... H01R 13/502

FOREIGN PATENT DOCUMENTS

CN 111834776 A 10/2020
TW M632889 U 10/2022
WO WO-2022083683 A1 * 4/2022

OTHER PUBLICATIONS

Office Action dated Jan. 18, 2023 of the corresponding Taiwan patent application No. 111126162.

* cited by examiner

*Primary Examiner* — Abdullah A Riyami
*Assistant Examiner* — Amara Anderson
(74) *Attorney, Agent, or Firm* — Chun-Ming Shih; HDLS IPR SERVICES

(57) ABSTRACT

This disclosure is directed to an electrical connector having an insulative seat, a first terminal group and a second terminal group. The first terminal group has first terminals embedded in the insulative seat, the first terminals are separated from each other, and each first terminal has a first wiring end. The second terminal group is separated from the first terminal group, the second terminal group has second terminals and a connecting strip, the second terminals are embedded in the insulative seat, each second terminal has a (Continued)

second wiring end. The first and the second terminals are arranged on a reference plane, the first and the second terminals protrude from one side of the insulative seat, and the second terminals are bent to deviate from the reference plane, and the connecting strip is connected with the second terminals to make the second terminals be electrically connected with each other.

8 Claims, 12 Drawing Sheets

201

ELECTRICAL CONNECTOR WITH EASIER MANUFACTURING AND ASSEMBLY

BACKGROUND OF THE DISCLOSURE

Technical Field

This disclosure is directed to an electrical connector, which has a connecting strip to connect a part of terminals to facilitate manufacturing and assembling.

Description of Related Art

A related-art electrical connector generally has a plurality of terminals, the terminals are generally elongated metallic strips, and the terminals are arranged at intervals in an insulator so as to be insulative with each other. Each terminal is defined for a specific usage, such as power supply, signal transmission, or grounding. Moreover, each terminal is soldered with a wire of corresponding usage. A part of the wires has a metal shielding layer, and the wires are connected to the corresponding terminals by soldering. In order to ground the metal shielding layer, a grounding terminal is generally disposed at one side of the terminal, and a leg is laterally extended from the grounding terminal to contact the metal shielding layer.

The terminals should be placed into a mold of the insulator one by one during manufacturing the electrical connector. The terminals are numerous and the terminals should be positioned one by one, the manufacturing process is complicated. Furthermore, it is inconvenient to solder the wires.

In view of the above drawbacks, the inventor proposes this disclosure based on his expert knowledge and elaborate researches in order to solve the problems of related art.

SUMMARY OF THE DISCLOSURE

This disclosure is directed to an electrical connector which is easy to be manufactured and assembled.

This disclosure is directed to an electrical connector, having an insulative seat, a first terminal group and a second terminal group. The first terminal group has a plurality of first terminals embedded in the insulative seat, the first terminals are arranged separately and each first terminal has a first wiring end. The second terminal group is separated from the first terminal group, the second terminal group has a plurality of second terminals and a connecting strip, the second terminals embedded in the insulative seat, each of the second terminals has a second wiring end. The first terminals and the second terminals are arranged on the same reference plane, the first wiring end and the second wiring end penetrate out of the insulative seat from a side of the insulative seat, each second wiring end is bent to deviate from the reference plane, and the connecting strip is connected with the second wiring ends to make the second terminals be electrically connected with each other.

According to the electrical connector of this disclosure, the first terminals and the second terminals are arranged spacedly and parallel to each other.

According to the electrical connector of this disclosure, the first terminals and the second terminals are disposed in a staggered arrangement. Each first wiring end is disposed adjacent to the connecting strip. The connecting strip is disposed at a side of the reference plane. The second terminals are connected with each other by the connecting strip. The second terminals are electrically connected with the same electric potential via the connecting strip. The connecting strip is electrically connected to a ground.

The electrical connector of this disclosure further has a conductive cable. The conductive cable has a conductive core, an insulative layer wrapping the conductive core and a conductive layer wrapping the insulative layer. The conductive core protrudes out of the insulative layer from an end of the conductive cable to be soldered with the first wiring end, and the conductive layer is soldered with connecting strip.

According to the electrical connector of this disclosure, when the conductive cables are respectively soldered with the first terminal and the second terminal, the conductive cable may be placed to straddle the connecting strip to contact the first wiring ends for soldering. Moreover, the connecting strip may be a scrap of a material strip of the second terminal, the second terminals are manufactured in batches by punching, and a segment cut from the scrap may be used as the connecting strip and the second terminals may be placed into a mold of the insulative seat in batches. Therefore, it is not necessary to arrange a lateral leg on each second terminal for straddling the conductive cables.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
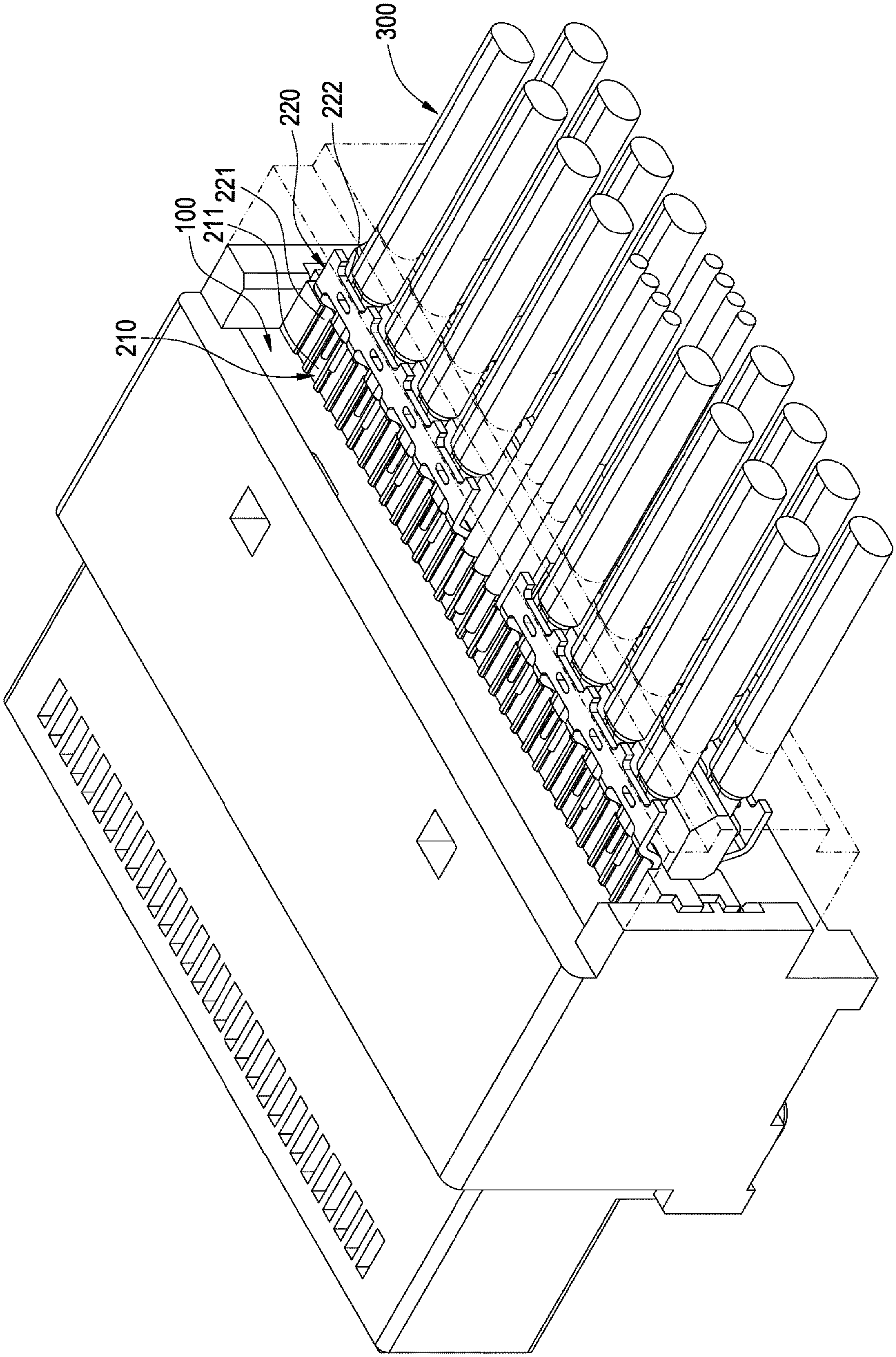
FIG. 1 is a perspective view showing an electrical connector according to an embodiment of this disclosure.
Figure 2:
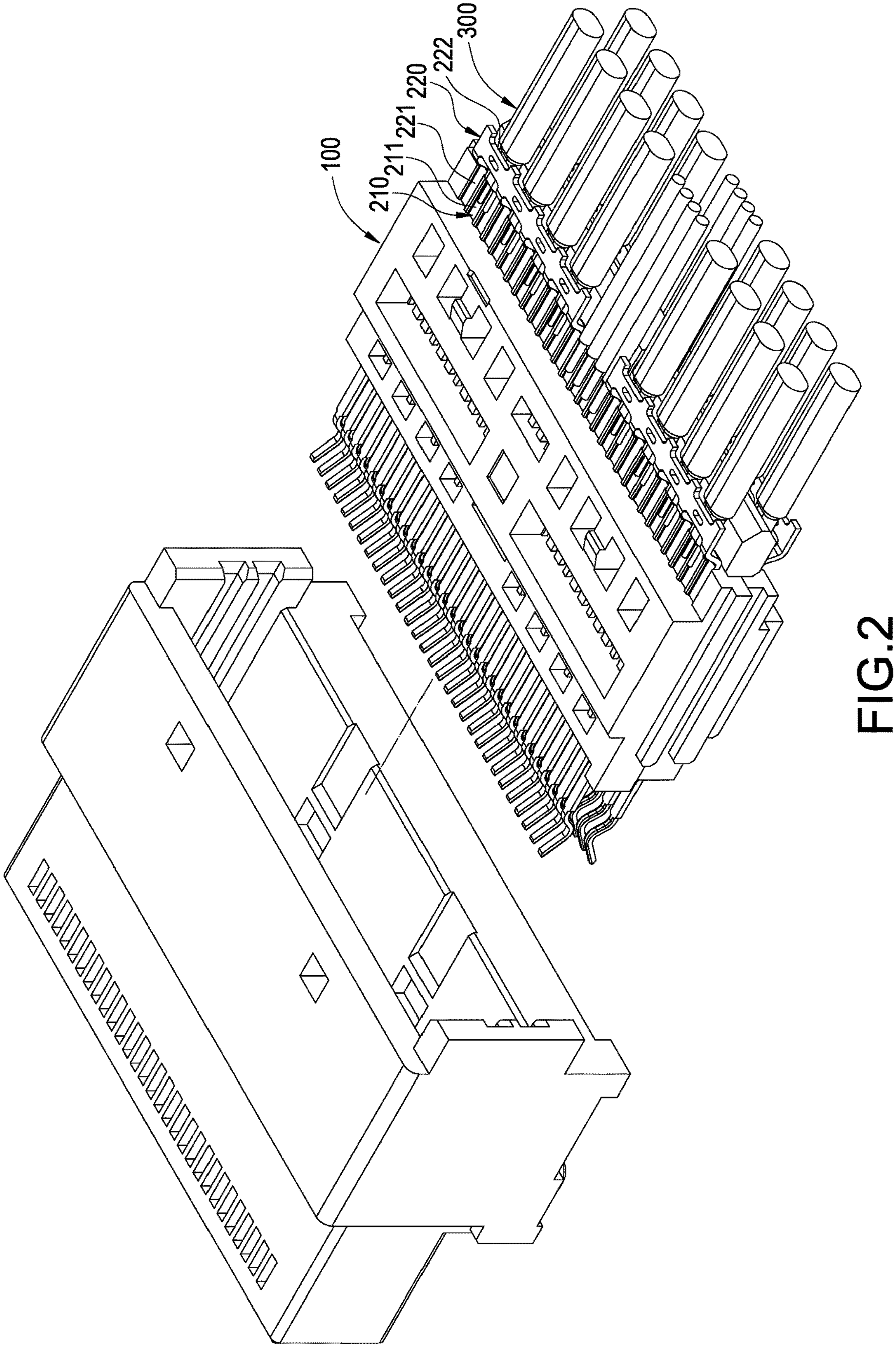
FIGS. 2 to 4 are exploded views showing the electrical connector according to the aforementioned embodiment of this disclosure.
Figure 3:
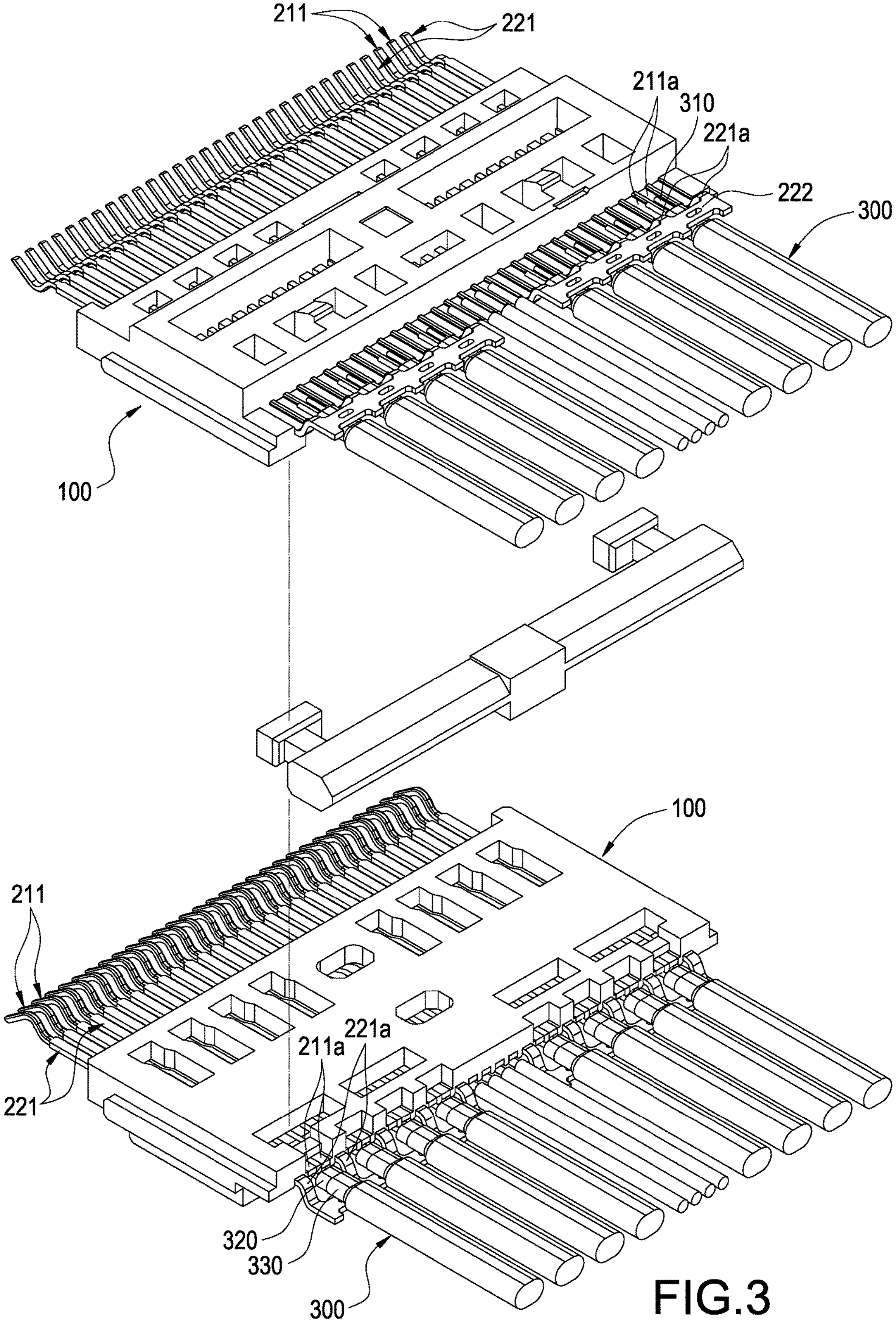
Figure 4:
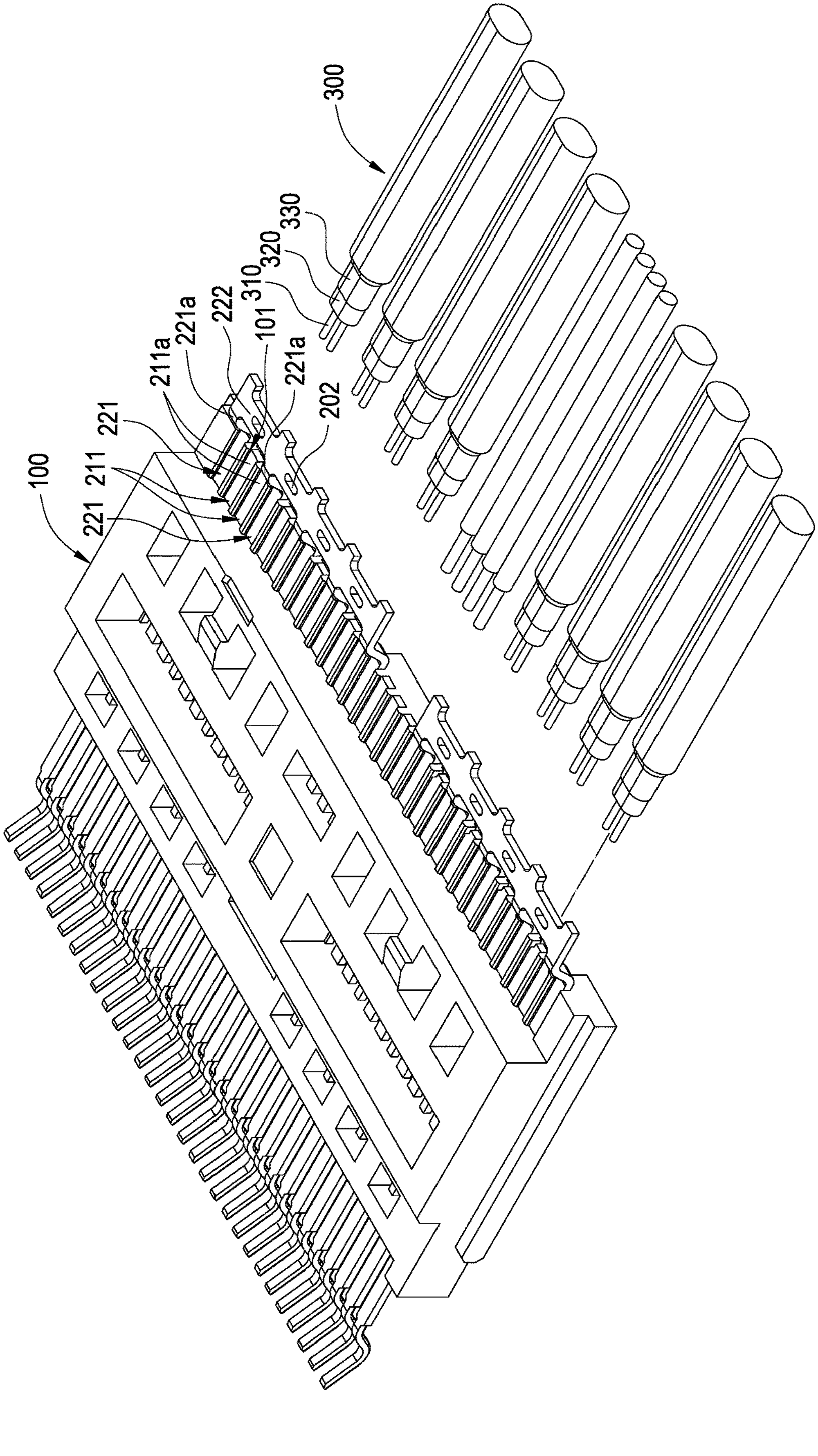
Figure 5:
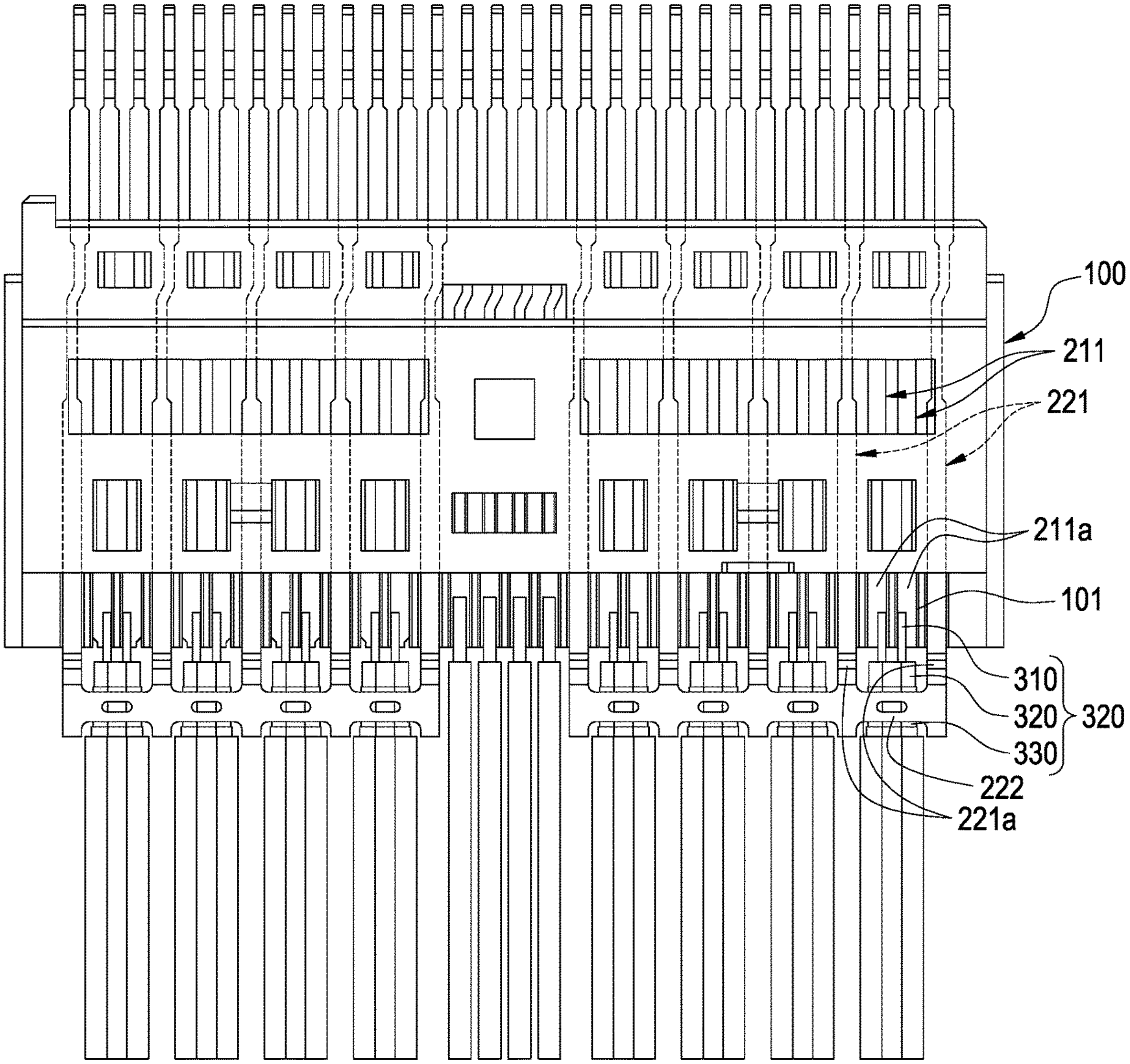
FIGS. 5 to 8 are perspective views showing an arrangement of the first terminal groups and the second terminal groups of the electrical connector according to the aforementioned embodiment of this disclosure.
Figure 6:
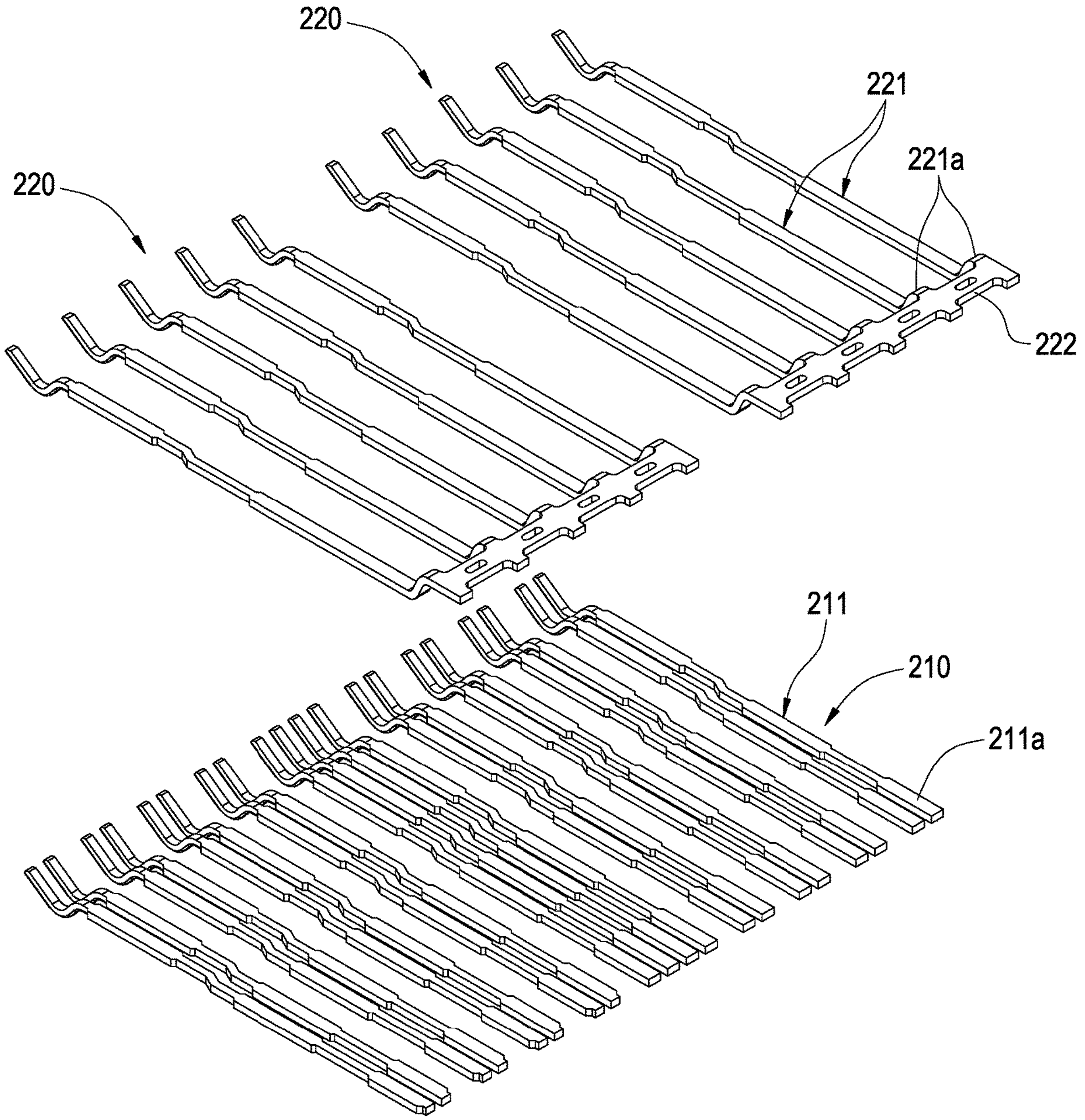
Figure 7:
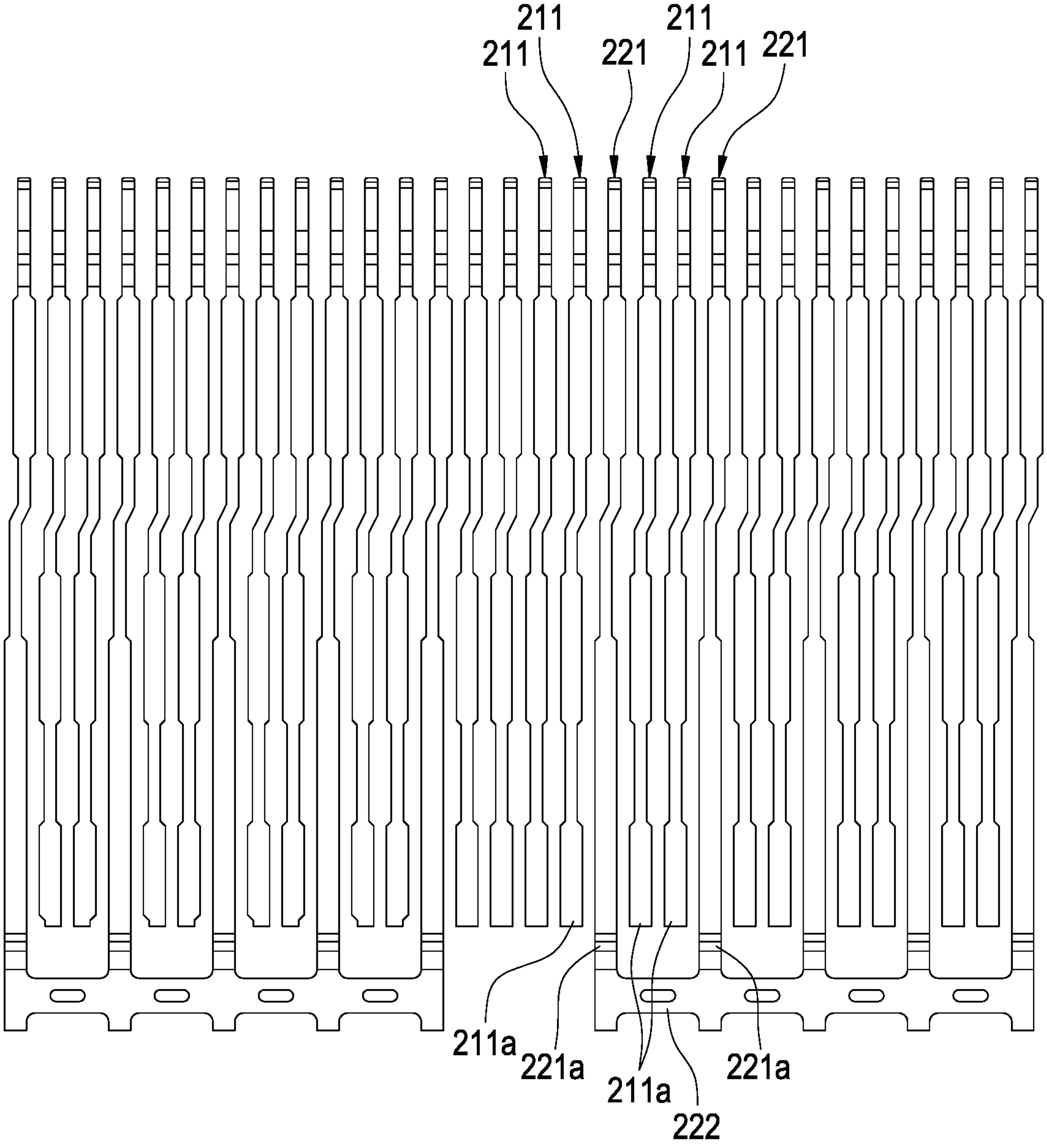

The technical contents of this disclosure will become apparent with the detailed description of embodiments accompanied with the illustration of related drawings as follows. It is intended that the embodiments and drawings disclosed herein are to be considered illustrative rather than restrictive.

According to an embodiment of this disclosure shown in FIGS. 1 to 4, an electrical connector having at least one insulative seat 100 is provided, and at least one first terminal group 210 and at least one second terminal group 220 corresponding to the first terminal group 210 are embedded in the insulative seat 100. The insulative seat 100 is flat and made of plastic. In some embodiments, two insulative seats 100 arranged symmetrically are provided. The number of the insulative seats 100 is not limited to the embodiment of this disclosure. One first terminal group 210 and two second terminal groups 220 corresponding to each other are embedded in each insulative seat 100. The numbers of the first terminal group 210 and the second terminal group 220 in each insulative seat 100 are not limited to the embodiment of this disclosure. One of the insulative seats 100 and the corresponding first terminal group 210 and second terminal groups 220 are described hereinafter as an example.

According to FIGS. 4 to 7, the first terminal group 210 has a plurality of first terminals 211, the first terminals 211 are embedded in the insulative seat 100. The first terminals 211 are spaced from each other to be insulated from each other. Each first terminal 211 has a first wiring end 211*a*, and the first wiring ends 211*a* protrude out of the insulative seat 100 from a side of the insulative seat 100.

The second terminal group 220 has a plurality of second terminals 221 and a connecting strip 222, the second terminals 221 are embedded in the insulative seat 100, the second terminals 221 are connected with each other by the connecting strip 222 to be electrically connected with each other. The second terminals 221 are electrically connected with the same electrical potential via the connecting strip 222. Specifically, the connecting strip 222 may be electrically connected to a ground point (not shown in the figures) to ground the second terminals 221. The ground point is not limited to the type recited in the embodiment of this disclosure, the electrical connector may be provided with a metal shield (not shown in the figures) used as the ground point, and the connecting strip 222 is grounded by contacting the metal shield. The connecting strip 222 may be soldered to another ground point (for example, a circuit board) for grounding.

Figure 8:
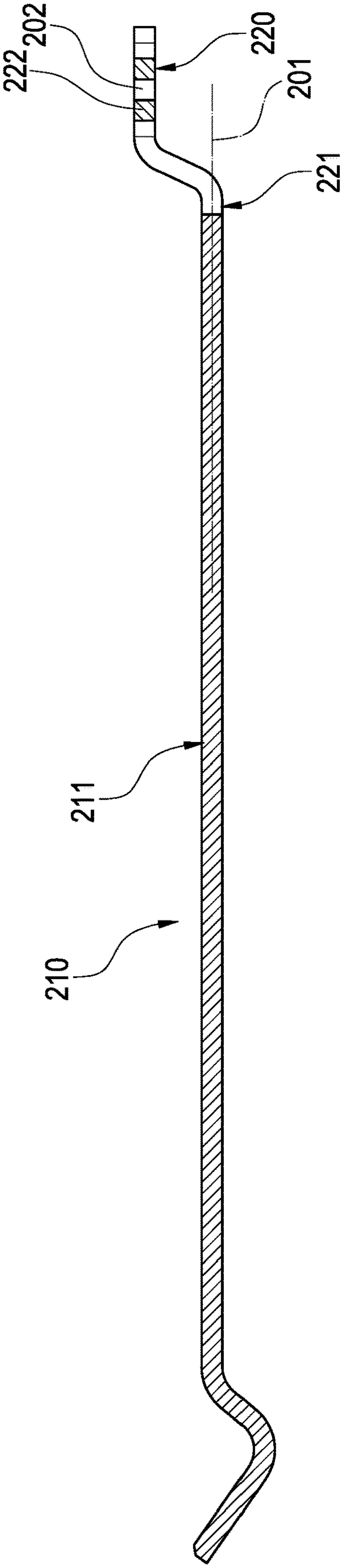
Figure 9:
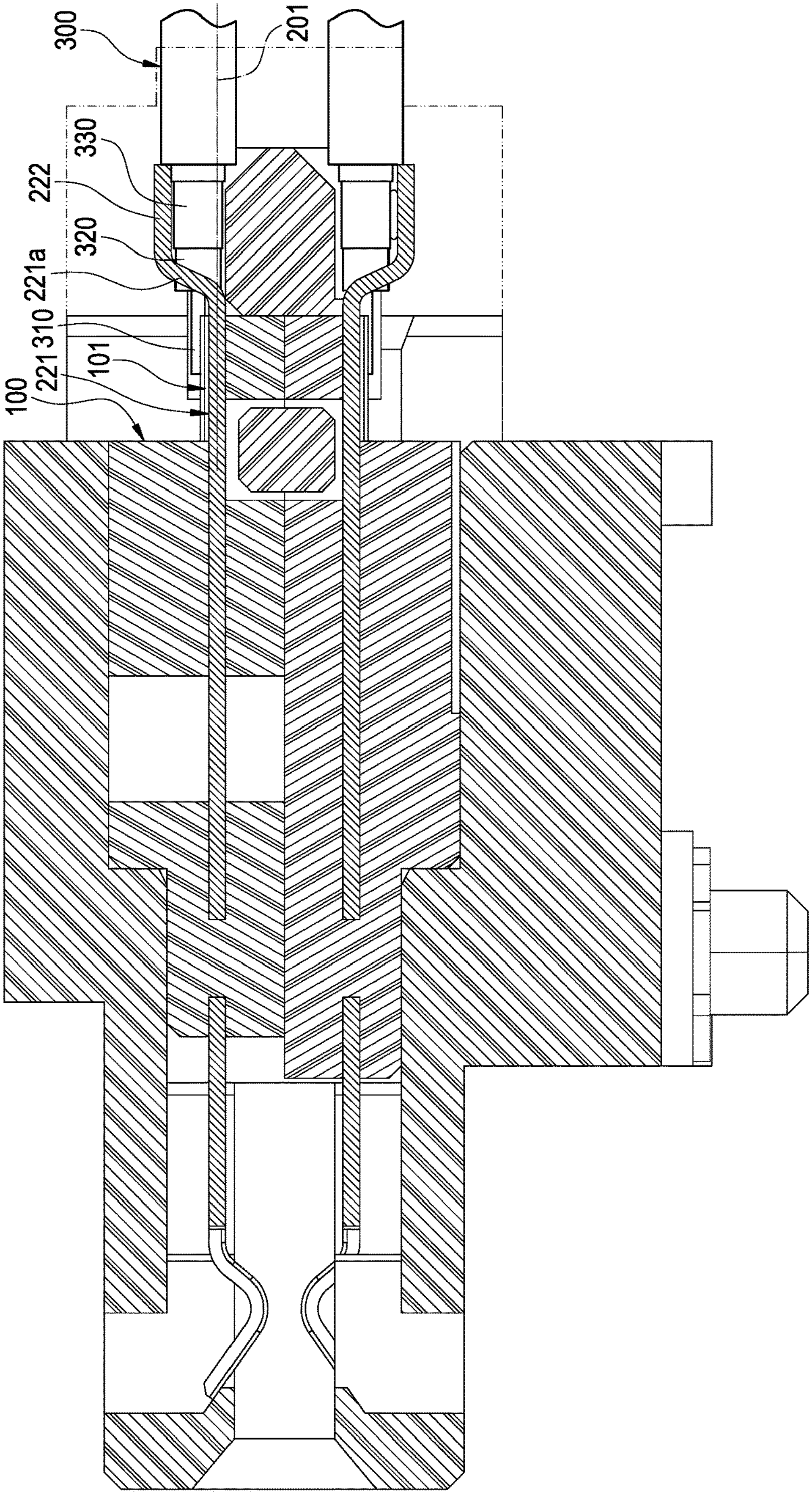
FIGS. 9 to 10 are longitudinally cross-sectional views of the electrical connector according to the aforementioned embodiment of this disclosure.
Figure 10:
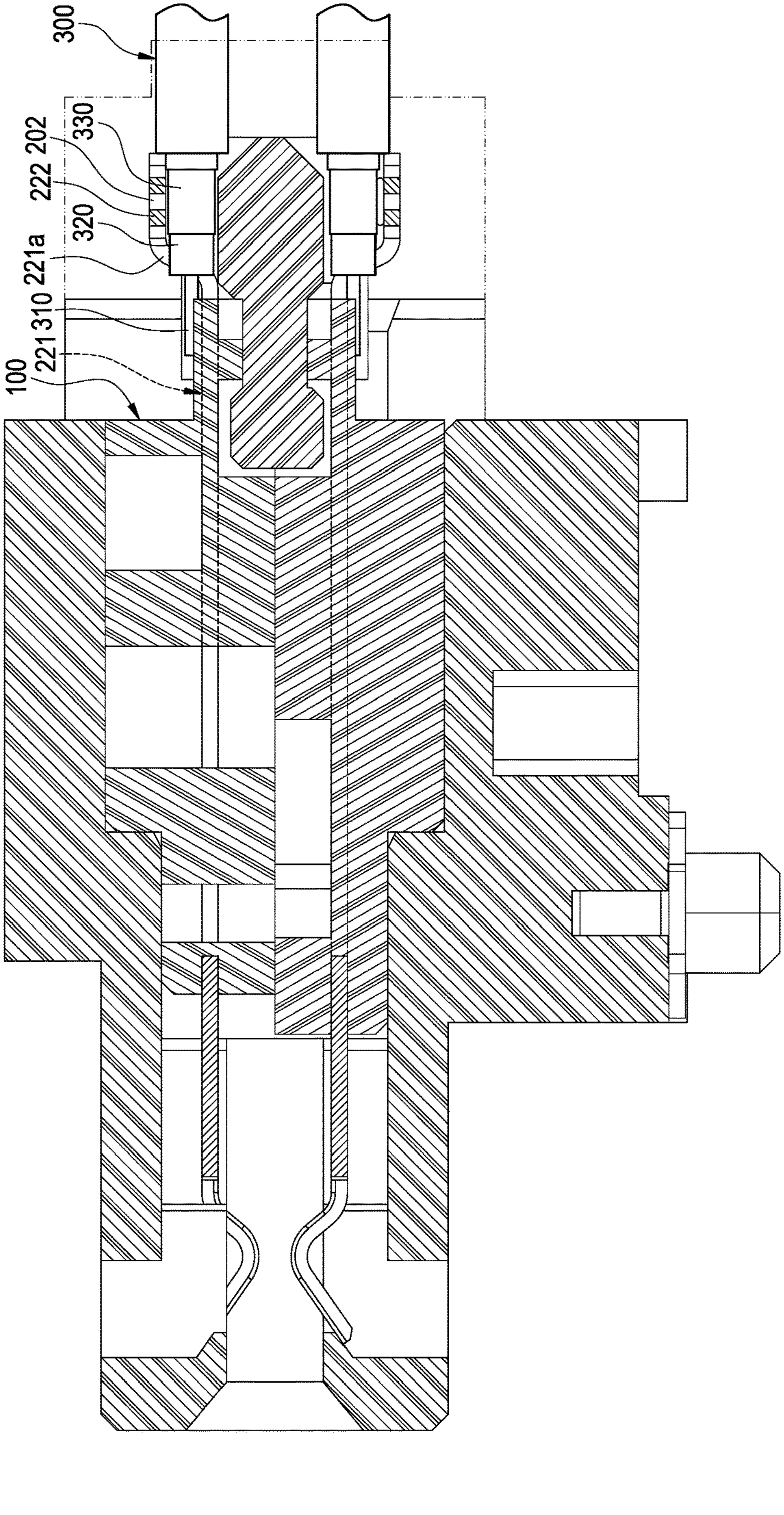

The second terminal group 220 and the first terminal group 210 are arranged separately to be insulated from each other. Specifically, according to FIGS. 5, 7 and 8, the first terminal 211 and the second terminal 221 are arranged on the same reference plane 201, the first terminals 211 and the second terminals 221 are arranged spacedly and parallel to each other, and the first terminals 211 and the second terminals 221 are disposed in a staggered arrangement. According to FIGS. 4 and 5, each second terminal 221 has a second wiring end 221*a*, the first wiring end 211*a* and the second wiring end 221*a* extend out of the insulative seat 100 from a side of the insulative seat 100. According to FIGS. 4-5 and 9-10, each second wiring end 221*a* is bent to deviate from the reference plane 201, and the connecting strip 222 is connected with the second wiring end 221*a* to make the second terminals 221 be connected with each other. Therefore, the connecting strip 222 is disposed at a side of the reference plane 201 to stagger from an extension line of the first wiring ends 211*a* on the reference plane 201. Furthermore, each first wiring end 211*a* is extended to be adjacent to the connecting strip 222 without exceeding the connecting strip 222.

Figure 11:
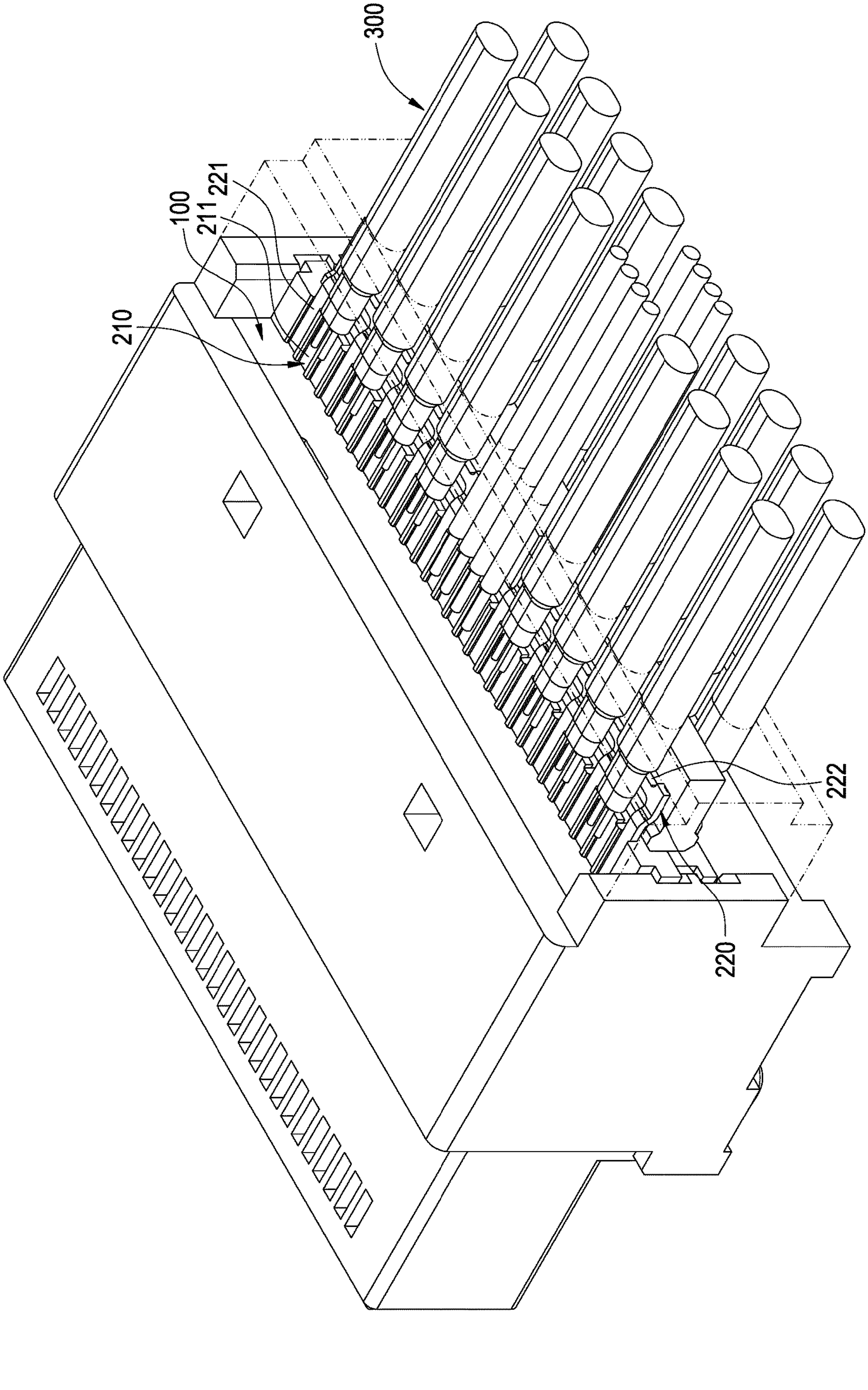
FIGS. 11 to 12 are perspective view showing variations of the electrical connector according to the aforementioned embodiment of this disclosure.
Figure 12:
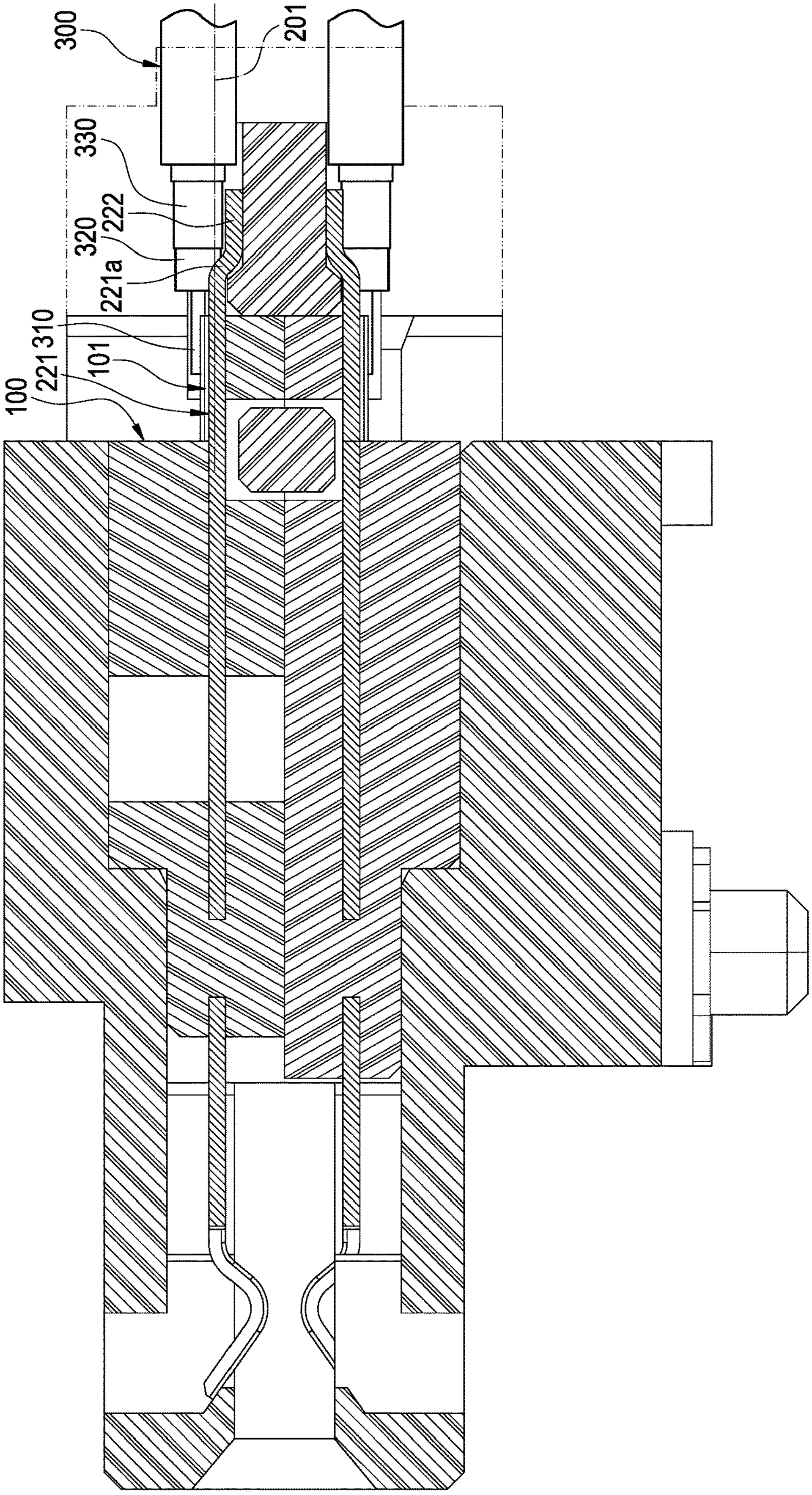

The direction of the connecting strip 222 deviated from the reference plane 201 is not limited to the embodiments of this disclosure. For example, according to FIGS. 11 and 12, the connecting strip 222 may be deviated toward another side of the reference plane 201.

According to FIGS. 4-5 and 9-10, the electrical connector of this disclosure further has at least one conductive cable 300, the conductive cable 300 is corresponding to the first terminal 211 and the second terminal 221 in number, but the number is not limited to the embodiment of this disclosure. In general, the first terminals 211 are used for transmitting power or signals, and the second terminals 221 are used for grounding, the first terminal 211 and second terminal 221 may be unequal in number. Each conductive cable 300 has a conductive core 310, an insulative layer 320 wrapping the conductive core 310 and a conductive layer 330 wrapping the insulative layer 320, the conductive cable 300 may be wrapped by an insulative sheath. Each conductive cable 300 is correspondingly soldered with one of the first terminals 211 and one of the second terminals 221. Specifically, the insulative sheath at an end of the conductive cable 300 is stripped firstly during a soldering process so as to expose a portion of the conductive core 310 and a portion of the conductive layer 330, the conductive core 310 protrudes out of the insulative layer 320 from the end of the conductive cable 300 and is soldered with the first wiring end 211*a*, and the exposed portion of the conductive layer 330 is put on the connecting strip 222 and soldered with the connecting strip 222. The conductive layer 330 is generally used for shielding the conductive core 310 to avoid electromagnetic interferences. Therefore, the connecting strip 222 is generally grounded to ground the conductive layers 330.

According to FIGS. 4-5 and 9-10, a plurality of terminal slots 101 are defined in the insulative seat 100, each first wiring end 211*a* is accommodated in each terminal slot 101 and exposed externally, so that solders are restricted to each first wiring end 211*a* for soldering. The connecting strips 222 are provided with through holes 202 corresponding to the exposed positions of the conductive layers 330 of the conductive wires 300, and the solders are restricted in the through holes 202 to facilitate soldering the conductive layers 330.

In conclusion, when the conductive cables 300 are respectively soldered with the first terminal 211 and the second terminal 221, the conductive cable 300 may be placed to straddle the connecting strip 222 to contact the first wiring ends 211*a* for soldering. Moreover, the connecting strip 222 may be a scrap of a material strip of the second terminal 221, the second terminals 221 may be manufactured in batches by punching, and a segment cut from the scrap may be used as the connecting strip 222. The second terminals 221 may be placed into a mold of the insulative seat 100 in batches, and it is not necessary to position the second terminals 221 with each other. Therefore, it is not necessary to cut each second terminal 221 from the scrap and then put them into the mold as in the related art, and it is not necessary to arrange a lateral leg on each second terminal 221 for contacting the conductive cable 300.

While this disclosure has been described by means of specific embodiments, numerous modifications and variations could be made thereto by those skilled in the art without departing from the scope and spirit of this disclosure set forth in the claims.

What is claimed is:

1. An electrical connector, comprising:

an insulative seat;

a first terminal group, comprising a plurality of first terminals embedded in the insulative seat, the first terminals arranged separately, and each of the first terminals comprising a first wiring end;

a second terminal group, arranged separately from the first terminal group, comprising a plurality of second terminals and a connecting strip, the second terminals embedded in the insulative seat, each of the second terminals comprising a second wiring end; and a conductive cable, comprising a conductive core, an insulative layer wrapping the conductive core and a conductive layer wrapping the insulative layer, the conductive core protruding out of the insulative layer from an end of the conductive cable and soldered with the first wiring end, and the conductive layer soldered with the connecting strip, wherein the first terminals and the second terminals are arranged on a reference plane, the first wiring ends and the second wiring ends penetrate out of the insulative seat from a side of the insulative seat, each second wiring end is bent to deviate from the reference plane, and the connecting strip is connected with the second wiring ends to make the second terminals be electrically connected with each other;

wherein the connecting strip is provided with a plurality of through holes corresponding to an exposed position of the conductive layer of the conductive wire.

2. The electrical connector according to claim 1, wherein the first terminals and the second terminals are arranged spacedly and parallel to each other.

3. The electrical connector according to claim 2, wherein the first terminals and the second terminals are disposed in a staggered arrangement.

4. The electrical connector according to claim 1, wherein each first wiring end is disposed adjacent to the connecting strip.

5. The electrical connector according to claim 1, wherein the connecting strip is disposed on a side of the reference plane.

6. The electrical connector according to claim 1, wherein the second terminals are connected with each other by the connecting strip.

7. The electrical connector according to claim 1, wherein the second terminals are electrically connected with a same electric potential via the connecting strip.

8. The electrical connector according to claim 1, wherein the connecting strip is electrically connected to a ground.

* * * * *